UNITED STATES PATENT OFFICE.

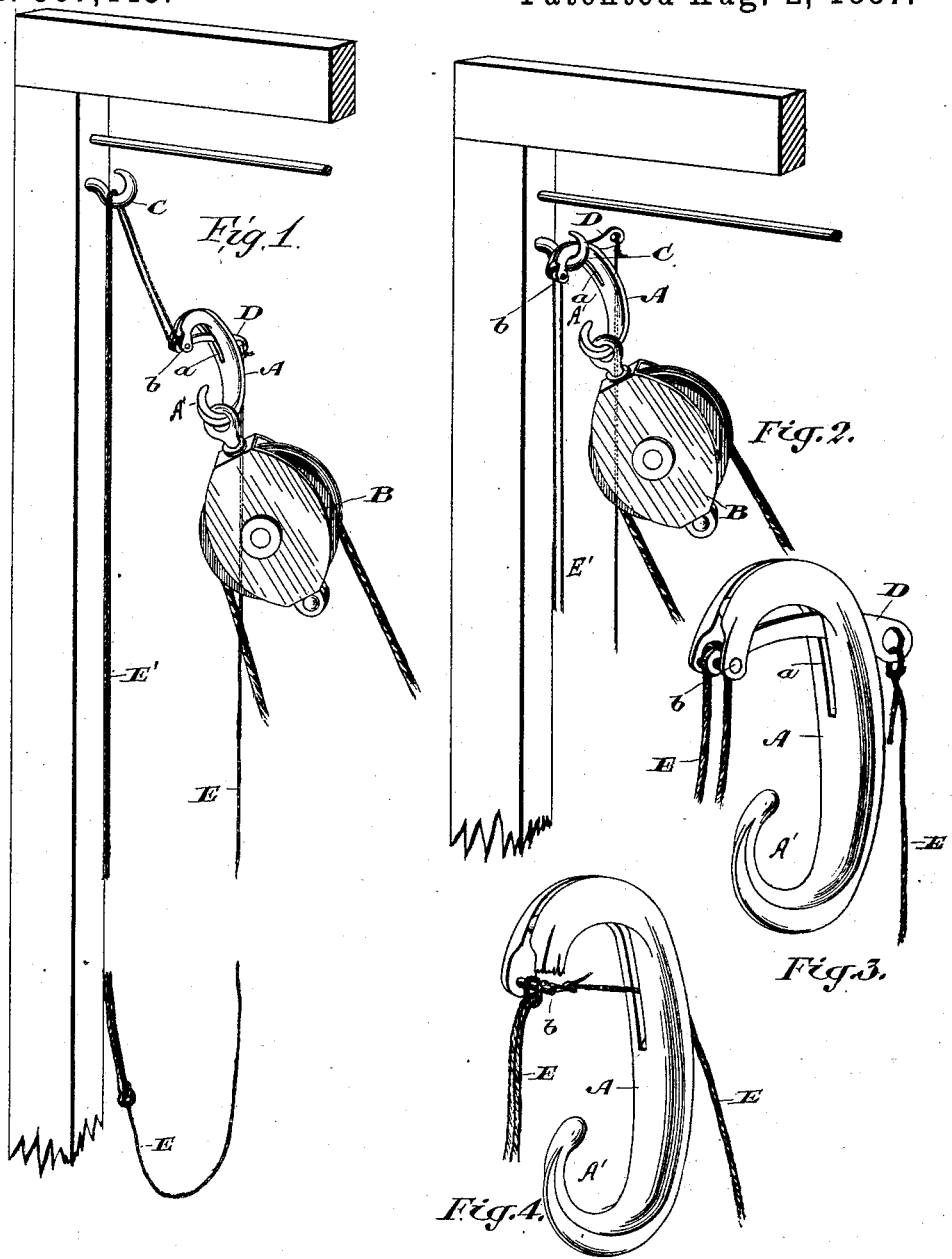

JAMES W. PROVAN AND JOHN W. PROVAN, OF OSHAWA, ONTARIO, CANADA.

PULLEY-HOISTER.

SPECIFICATION forming part of Letters Patent No. 367,443, dated August 2, 1887.

Application filed April 2, 1887. Serial No. 233,419. (No model.)

*To all whom it may concern:*

Be it known that we, JAMES WHITE PROVAN, manufacturer, and JOHN WHITE PROVAN, machinist, both of the town of Oshawa, in the county of Ontario, in the Province of Ontario, Canada, have jointly invented a certain new and useful Improved Pulley-Hoister, of which the following is a specification.

This invention relates to pulley-hoisters of that class provided with a latch, and a rope by which said latch is operated; and the invention consists in the peculiar combinations and the construction, arrangement, and adaptation of parts, all as more fully hereinafter described and claimed.

Figure 1 is a view of our device as it will appear while the pulley is being elevated. Fig. 2 is a view of the device showing the pulley suspended in position. Fig. 3 is view of our hooked stem provided with a hinged latch. Fig. 4 is a view showing the hoisting-rope utilized for the purpose of a latch.

Our device is specially designed for elevating the pulley-blocks used in connection with the rope for adjusting a hay-carrier, and it will be sufficient for the purpose of this specification to describe it in the application named; but of course it may be used for other purposes.

In the drawings, A represents a hooked stem, the lower portion of which is designed to fit into the eye of the pulley-block B, or to be otherwise connected to the said pulley-block. The upper end is designed to fit onto the floor-hook C, or any other elevated fixed device it is intended to suspend the pulley from.

D is a latch pivoted at the point of the upper hooked end of the stem A, and extends through a slot, $a$, made in the stem A.

E is a rope, one end of which is connected to the stem A at or near its pivot $b$, while its other end is connected to the tail of the latch outside of the slot $a$, as indicated; or, as shown in Fig. 1, the end may be attached to one end of the rope E', the other end of which is connected to the stem near the pivot $b'$.

When it is desired to elevate the pulley-block B and suspend it from the hook C, the rope E' is drawn upon, so as to raise the upper end of the stem A toward the floor-hook C.

Owing to the manner in which the rope E' is connected to the stem A, it will raise its point over the floor-hook C, thereby hooking it on, as indicated in Fig. 2.

When it is desired to lower the pulley-block B, the rope E is drawn upon, so as to pull down the latch D. This action raises the stem A, so that its point will clear the top of the hook C, when it may be lowered by means of the rope E.

Although we prefer to use a metal latch, D, the same effect would be produced if both ends of the rope E were connected to the pivot $b$, as indicated in Fig. 4, the portion of the rope which passes through the slot $a$ acting for the latch; and although we prefer to make the stem detachable from the pulley-block, it might be permanently attached to it.

We deem it important that the stem A be formed at its lower end with a hook, A', whereby it is adapted for use with any pulley-block; also, that the upper end of the stem be slotted, for this provides room for the attachment of the rope E' to the end of the stem on the pivot $b$, so that it will raise the point of the stem over the hook C.

What we claim as our invention is—

1. A hooked stem, A, connected to the pulley-block B and provided with a latch in the hooked end of the stem, and said stem formed at its lower end with a hook, A', and operated substantially as and for the purpose specified.

2. A stem, A, having a slotted hooked end and provided with the latch D, pivoted at $b$, and connected at its other end to the rope E, and said stem formed at its lower end with a hook, A', substantially as and for the purpose specified.

3. A stem, A, having a slotted hooked end, as shown, connected to the rope E' and provided with the latch D, pivoted at $b$ and extending through the slot $a$ to form a connection with the rope E on the outside of the stem A, substantially as and for the purpose specified.

Oshawa, March 21, 1887.

JAMES W. PROVAN.
JOHN W. PROVAN.

In presence of—
C. A. JONES,
J. J. OWENS.